(12) United States Patent
Aviram (10) Patent No.: US 6,314,684 B1
(45) Date of Patent: Nov. 13, 2001

(54) APPARATUS FOR ACTIVE MULTI-LOCKING OF SHEETS AND COLLECTION OF CONDENSATION WATER

(75) Inventor: Itzik Aviram, Mosave Shdema 20 D, N Emek Sorek 76855 (IL)

(73) Assignee: Itzik Aviram, Moshav Shdema (IR)

( * ) Notice: Subject to any disclaimer, the term of this patent is extended or adjusted under 35 U.S.C. 154(b) by 0 days.

(21) Appl. No.: 09/589,833

(22) Filed: Jun. 8, 2000

(51) Int. Cl.⁷ .................................................. E04D 13/00
(52) U.S. Cl. .................... 52/11; 52/222; 52/202; 160/392
(58) Field of Search .............. 52/63, 222; 160/327, 160/328, 380, 392

(56) References Cited

U.S. PATENT DOCUMENTS

| 4,189,880 | * | 2/1980 | Ballin | 52/202 |
| 4,566,236 | * | 1/1986 | Pound | 52/222 |
| 4,665,670 | * | 5/1987 | van den Burg | 52/222 |
| 4,682,642 | * | 7/1987 | Hogshead, III et al. | 160/392 |
| 5,809,709 | * | 9/1998 | Ryan et al. | 52/222 |

* cited by examiner

Primary Examiner—Carl D. Friedman
Assistant Examiner—Steve Varner
(74) Attorney, Agent, or Firm—Brinks Hofer Gilson Lione (57) ABSTRACT

The present invention provides the incorporation of a sheet locking device, a small gutter, and a mesh attachment device in a single unit. In another aspect of the present invention, a device for active multi-locking of sheets and surfaces made of plastic, nylon, paper, similar sheets, or thin surfaces is provided. In yet another aspect of the present invention, a right angled shape serves as an angle for the frame of the structure to which the device is attached. Further, the present invention also incorporates the use of a small gutter that can collect and drain water vapor that may accumulate on the roof of a hothouse.

17 Claims, 5 Drawing Sheets

APPARATUS FOR ACTIVE MULTI-LOCKING OF SHEETS AND COLLECTION OF CONDENSATION WATER

RELATED APPLICATIONS

Applicant claims, under 35 U.S.C. §119, the benefit of priority of the filing date of Jun. 9, 1999 of an Israeli Patent Application, Serial Number 130391, filed on the aforementioned date, the entire contents of which is incorporated herein by reference.

BACKGROUND

In the field of agriculture, various devices for attaching sheets of material are known. The prior art contains devices made of wood and aluminum that attach plastic sheets covering agricultural hothouses or greenhouses. One attachment device consists of a wooden pole upon which the plastic sheet is rolled. In order to attach the sheet, nails are inserted in the plastic sheet to attach it to the wooden rod.

In addition, attachment devices made of aluminum are also known. These aluminum attachment devices are based on the passive operation of placing a male and female component on one another. The sheet is attached by spreading the sheet on the female part, placing the male part on the female part, and subsequently attaching a clip that prevents the two parts from separating.

These devices have many disadvantages. The attachment devices made of wood are problematic because the method of attaching the plastic sheets by inserting nails through the sheet causes damage to the plastic sheets. These devices can only be used once, thereby preventing the reuse or adjustment of sheets. In addition, because of the aggressive method of attachment, it is not possible to use the wooden device for attaching sheets made of delicate materials, such as paper. Utilizing this method, delicate materials would tear.

Aluminum attachment devices in the prior art are also problematic because the plastic sheets are only passively attached. In these passive attachment devices, the two parts of the device, one on the other with the sheet between them, only have a clip holding them together. This method of attachment frequently causes the sheet to be cut in the place of attachment to the attachment device, and thus causes damage to the sheet and the loss of attachment and tension of the sheet. In addition, the metal clips tend to come loose and thus release the attachment of the sheet. It is therefore necessary to fit numerous metal clips and to check them frequently in order to verify that they remain in place.

None of the above types of devices provide the possibility of initial locking or temporary attachment of the sheets. Rather the prior art only allows for final attachment and fitting. This causes great difficulties when covering hothouses, stretching the sheets, and adjusting and correcting them as necessary.

In addition, the prior art does not account for drainage of the condensation water. In agricultural hothouses in which there is a system for controlling the irrigation and the climate inside them, condensation water typically accumulates in random places in the roof of the hothouse and drips on the plants. This affects the monitoring and control of the climate and the irrigation in the hothouse. Further, the condensation water dripping downwards may produce various diseases in the plants. Consequently, it would be desirable to provide a way to collect and drain the accumulated condensation water.

Further, these devices do not have the shape of an angle, and the constructor must therefore attach angles to produce a frame for the structure. It would therefore also be desirable to utilize a device for attaching sheets that is already angled to produce a frame.

There is a need for an efficient device that will produce active and strong locking of sheets, including plastic sheets for hothouses, capable of multiple uses, i.e., the ability to remove and attach sheets again and again without damaging them. In addition there is also a need for a device that collects the condensation water accumulating mainly in the roof of the hothouse. Further, it would be beneficial to integrate an angle support into the design of the aforementioned devices.

BRIEF SUMMARY

The present invention addresses the deficiencies in the prior art by providing a locking device that is useful for connecting sheets of materials without damaging the sheets and that minimizes the number of pieces needed to secure the sheets together. One common application for the invention is agricultural hothouses, where it is necessary to cover the hothouse with plastic sheets on all sides. One aspect of the present invention provides a locking device that may be fitted to the roof of the hothouse or to the side beams of the hothouse. This locking device allows one to fix, stretch and lock the sheets covering the hothouse on all sides. The locking device, as well as a small gutter, may be attached to the roof of the hothouse. One embodiment of the present invention, comprising a locking device, a small gutter and a right angled base, may be fitted to the beam between the roof and the side wall of the hothouse, where base serves as an angle for the frame of the hothouse and thus eliminates the need for fitting an angle in addition to the locking device, the mesh attachment device, and the small gutter.

Another aspect of the present invention combines a sheet locking device, a small gutter, and a mesh attachment device in a single unit. In yet another aspect of the present invention, a device for active multi-locking of sheets and surfaces made of plastic, nylon, paper, or similar sheets or thin surfaces is provided. In yet another aspect of the present invention, a right angled shape serves as an angle for the frame of the structure to which the device is attached. Further, the present invention also contemplates the use of a small gutter that can collect and drain water vapor that may accumulate on the roof of a hothouse.

The device for active multi-locking of sheets in the presently preferred embodiment consists of two complementary pieces. The sheet is locked by placing a male piece inside a female piece. The locking produced by this device forms absolute locking in one direction, while the locking in the other direction is initial only and permits simple release of the sheets or surface, if necessary, without damaging them.

In a presently preferred embodiment, there is also a base that has two perpendicular edges. One edge contains a device for active multi-locking of sheets and a small gutter for the collection of condensation water. The other edge contains a device for attaching a mesh for hot houses. The angled shape of the base serves as an angle for the frame of the structure, and eliminates the need for fitting an angle for the structure in addition to the sheet locking device, the small gutter and the mesh attachment device, since it combines these devices with the angle into a single unit In addition, the presently preferred embodiment incorporates a small gutter to collect condensation water, such as the condensation water that accumulates on the roof of a hothouse, and drain it to one or more drainage points. The drainage point may be chosen by the assembler at any point along the water collection line produced by the installation of several small gutters, one alongside the other.

By eliminating the need to provide separate devices for locking sheets, collecting condensation, and attaching mesh, the present invention provides a significant advance in the agricultural field. In addition, this invention advances the art by providing an angle for attaching the locking device and mesh attachment device to a structure. Further, the present invention advances the art by providing an improved method of active multi-locking and an effective way to collect and drain condensation water.

DETAILED DESCRIPTION OF THE PRESENTLY PREFERRED EMBODIMENTS

For the purpose of this application, the following definitions are provided:

(1) Sheet: a thin surface made of paper, mesh, plastic, nylon, cloth, or other material.

(2) Multi-locking: Locking the sheet in such a way that it is possible to remove the locking device from the sheet and refit it, again and again, as a frame for the same structure or as a frame for other structures, without damaging the sheet, in order to permit the sheet to be reused, to adjust the tension of the sheet, to change the shape of the structure, to dismantle the sheet, etc.

(3) Active locking: A locking action performed by the locking device itself because of the special shape and structure of its components, so that the sheet is held by the internal strength of the device.

(4) Passive locking: A locking action performed by the locking device aided by a device or object outside the locking device and/or a locking action that does not result from the independent strength of the device.

(5) Absolute locking: Strong locking that does not permit the release of the sheet except for releasing or neutralizing the locking device, by applying very considerable force, or by tearing the sheet.

(6) Initial locking: Locking which is not absolute but is made with such force that it on one hand permits the sheet to be held and locked in place, but on the other hand permits easy, rapid release of the sheet when required.

(7) Gutter: A device consisting of a surface bent at the end intended to collect and drain condensation water.

The present invention refers to an active multi-locking device for sheets and surfaces of plastic, nylon, paper, and similar sheets or thin surfaces. The presently preferred embodiment refers to a profile comprising two perpendicular parts, one of which contains an active multi-locking device for sheets and a small gutter for the collection of condensation water, and the other contains a device for attaching a mesh to hothouses.

The presently preferred embodiment utilizes a locking device consisting of two profiles, the locking of the sheet being performed by inserting one profile inside the other. The locking produced by the device is absolute locking in one direction. In the other direction the locking is initial only, permitting release and re-attachment of the sheet, again and again, as necessary, without damage.

In addition, a small gutter is integrated into the presently preferred embodiment. This gutter allows for the collection of condensation water, such as the condensation water accumulating on the roof of a hothouse, and control of its drainage to one or more drainage points. The drainage point may be chosen by the assembler at any point along the water collection line produced by the installation of several small gutters, one alongside the other.

Further, the presently preferred embodiment utilizes an angled base and rounded ends. The angled shape provides a frame and eliminates the need for fitting an angle for the structure. In addition to other uses, the rounded ends prevent friction and other forms of damage between the parts and facilitate manual contact.

Figure 1:
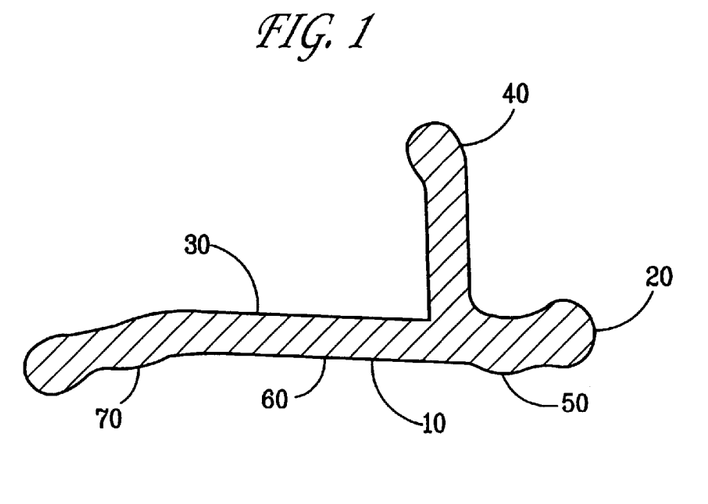
FIG. 1 is cross-sectional view of the male locking member utilized in the presently preferred embodiment.
Figure 2:
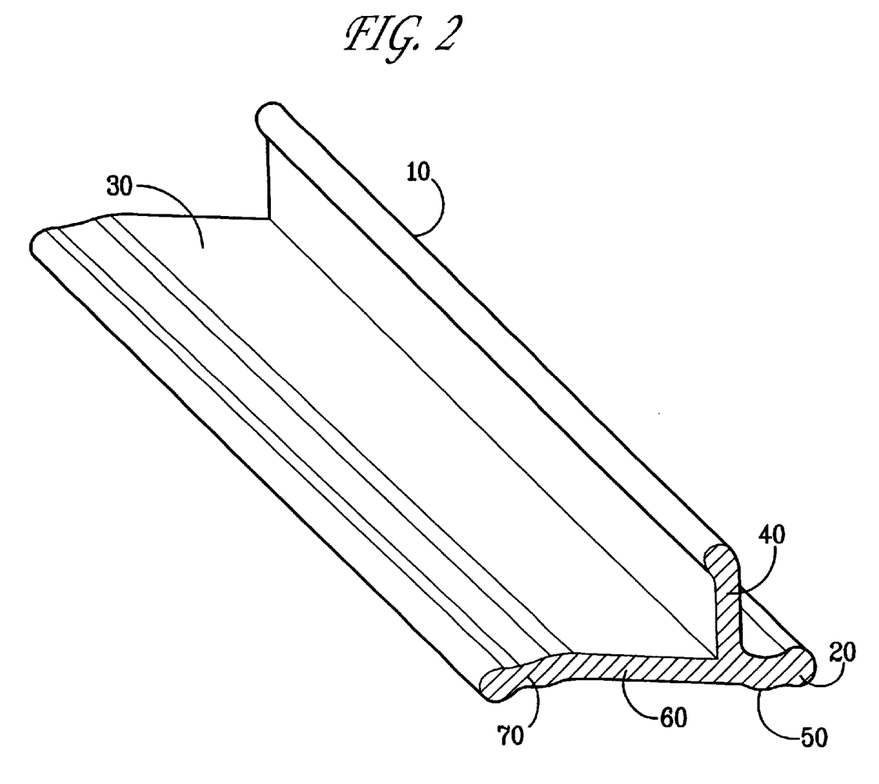
FIG. 2 is a perspective view of the male locking member utilized in the presently preferred embodiment.

Referring now to FIGS. 1 and 2, presented are views of the male locking member operative to enter the female locking member in the presently preferred embodiment. Male locking member 10 can be divided into three parts: a primary protrusion 20, a secondary protrusion 30, and a support extension 40. In the alternative, the male locking member can be categorized as having two parts wherein primary protrusion 20 and secondary protrusion 30 comprise one part aligned substantially perpendicular to the support extension 40.

The primary protrusion 20 is joined with the secondary protrusion 30 and the support extension 40 at one end. As the primary protrusion 20 extends, it bends toward the support extension 40 and terminates in a rounded end. On the side opposite to the support extension, the primary protrusion 20 contains a spline 50.

The secondary protrusion 30 consists of a straight portion 60 and a bent portion 70. The first end of the straight portion 60 is attached to the primary protrusion 20 and the support extension 40. The other end of the straight portion 60 is attached to the first end of the bent portion 70. The bent portion 70 bends away from the support extension 40 and terminates in a rounded end.

The support extension 40 joins with the primary protrusion 20 and secondary protrusion 30 on one end. The other end, like the other terminating ends of the male locking member 10, is rounded.

Figure 3:
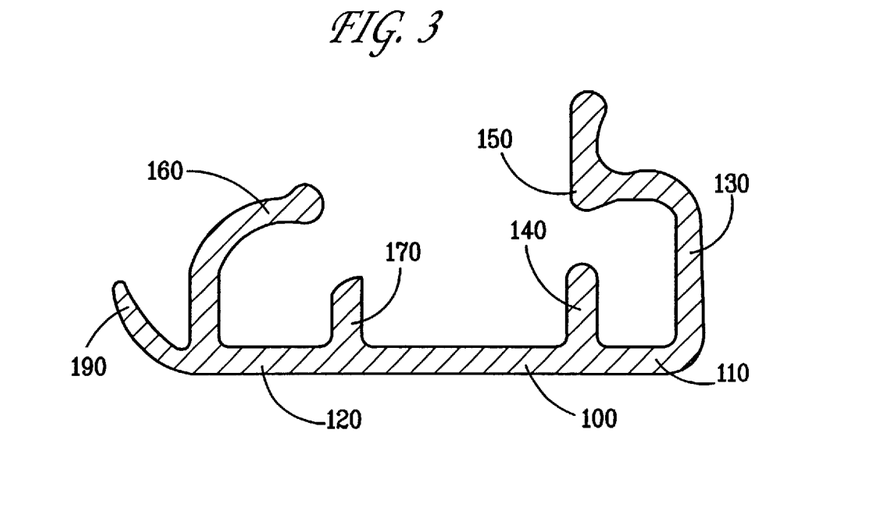
FIG. 3 is a cross-sectional view of the female locking member and gutter utilized in the presently preferred embodiment.
Figure 4:
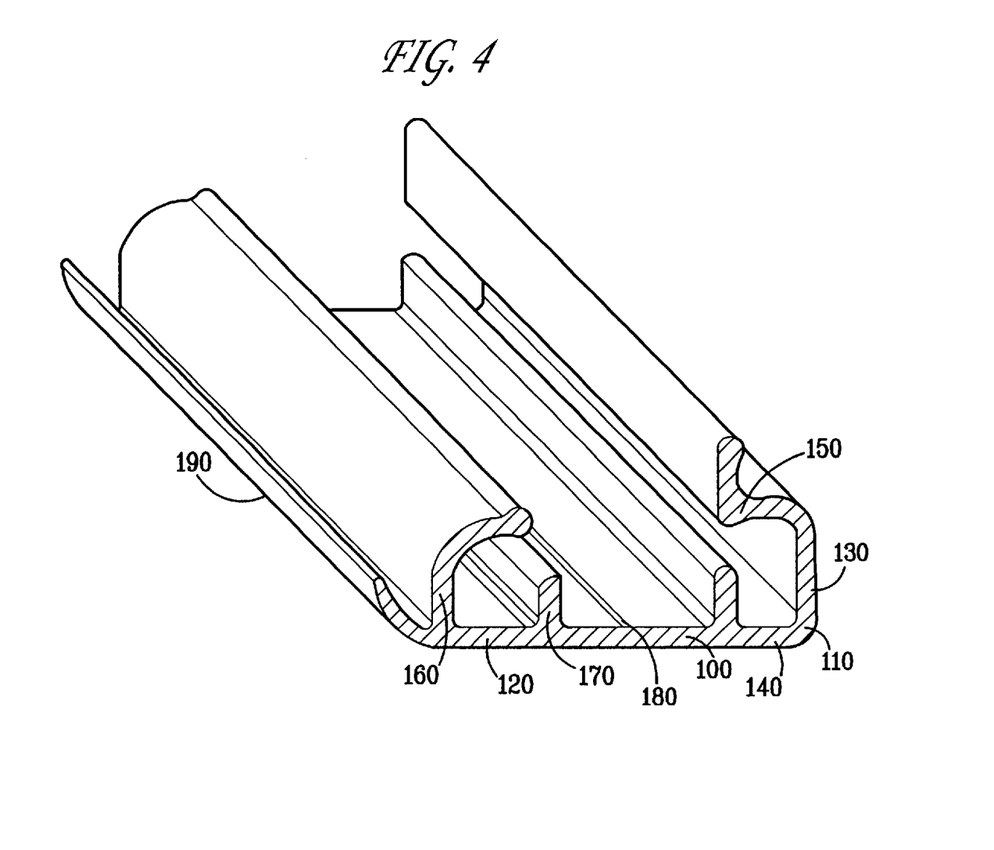
FIG. 4 is a perspective view of the female locking member and the gutter utilized in the presently preferred embodiment.

Referring now to FIGS. 3 and 4, presented are views of the female locking member in the presently preferred embodiment. In the presently preferred embodiment, the female locking member 100 has two locking portions: the primary locking portion 110 and the secondary locking portion 120.

The primary locking portion comprises a primary curved member 130 and a primary projection 140. The primary curved member 130 is initially parallel to the primary projection 140. Subsequently, the primary curved member 130 changes direction through a right angle, turning toward the primary projection 140 until it is substantially perpendicular to the primary projection 140. The primary curved member 130 then changes direction again through a right angle, turning away from the primary projection 140 until is it substantially parallel to its original direction. This second change of direction forms a rounded corner 150.

In the presently preferred embodiment, primary curved member 130 has corners created by the changes in direction and the terminated end that are rounded. Similarly, the primary projection 140 is rounded across its length. The combination of the primary curved member 130 and primary projection 140 creates a gap with a width equal to or greater than the width of primary protrusion 20.

The secondary locking portion 120 comprises a secondary curved member 160 and a secondary projection 170. The secondary curved member 160 is initially parallel to the secondary projection 170. Subsequently, the secondary curved member 160 curves toward the secondary projection 170 until it is substantially perpendicular to the secondary projection 170. The secondary curved member 160 is rounded along its length and terminates in a rounded end. The secondary projection 170 has an end that is cut off diagonally in a downward slope toward the secondary curved member 160. This end is designed to match the bend in the secondary protrusion 30 of the male locking member 10. The combination of the secondary curved member 160 and the secondary projection 170 forms a gap that is equal to or greater than the width of the secondary protrusion 30.

The primary locking portion 110, comprised of the primary curved member 130 and primary projection 140, attaches and locks with the primary protrusion 20 and a sheet. In the presently preferred embodiment, the spline 50 abuts with the primary projection 140 and the bend in the primary protrusion 20 abuts with the rounded corner 150. In this way, the primary protrusion 20 and a sheet are pressed and locked within the primary locking portion 110. Further, the primary curved member 130 and the support extension 40 may be used as handles for performing manual locking of the sheets. In addition, the primary curved member 130 and the support extension 40 may serve as a location for an additional metal clip that may strengthen the initial locking.

Similarly, the secondary locking portion 120, comprised of the secondary curved member 160 and the secondary projection 170, attaches and locks with the secondary protrusion 30 and the sheet. The bent portion 170 of the male locking member 10 and the diagonally cut rounded end of the secondary projection 170 simplifies the entry of the secondary protrusion 30 at the beginning of the locking process. In addition, the bent portion 70 and the end of the secondary projection 170 also simplify the pulling back of the male locking member 10 and prevent friction, or other damage, between the secondary protrusion 30 and the secondary curved member 160.

After locking the sheet by inserting the male locking member 10 into the female locking member 100, the sheet is actively locked. The sheet is absolutely locked in one direction (towards the interior of the structure) and is initially locked in the opposite direction (outwards from the structure). A metal clip may also be attached to strengthen the initial locking. This clip may be manually removed at will.

In addition to the locking characteristics, the female locking member 100 also provides a foundation for affixing the present embodiment to a structure. As shown in FIG. 4, a groove 180 is located in between the primary projection 140 and the secondary projection 160. The groove 180 is intended to serve as a marking strip for drilling holes for locking screws. These screws, which serve to attach the presently preferred embodiment to a structure, are additionally held in place by the primary projection 140 and secondary projection 170. By tightening the head of the screw between the primary projection 140 and the secondary projection 170, the rotation and release of a screw is prevented. Additionally, the primary projection 140 and secondary projection 170 provide a base for the attachment and stability of the male locking member 10.

Also included in FIGS. 3 and 4 is a gutter 190 that is integrated onto the female locking member 100. The gutter 190 is described below with the discussion of FIG. 6.

Figure 5:
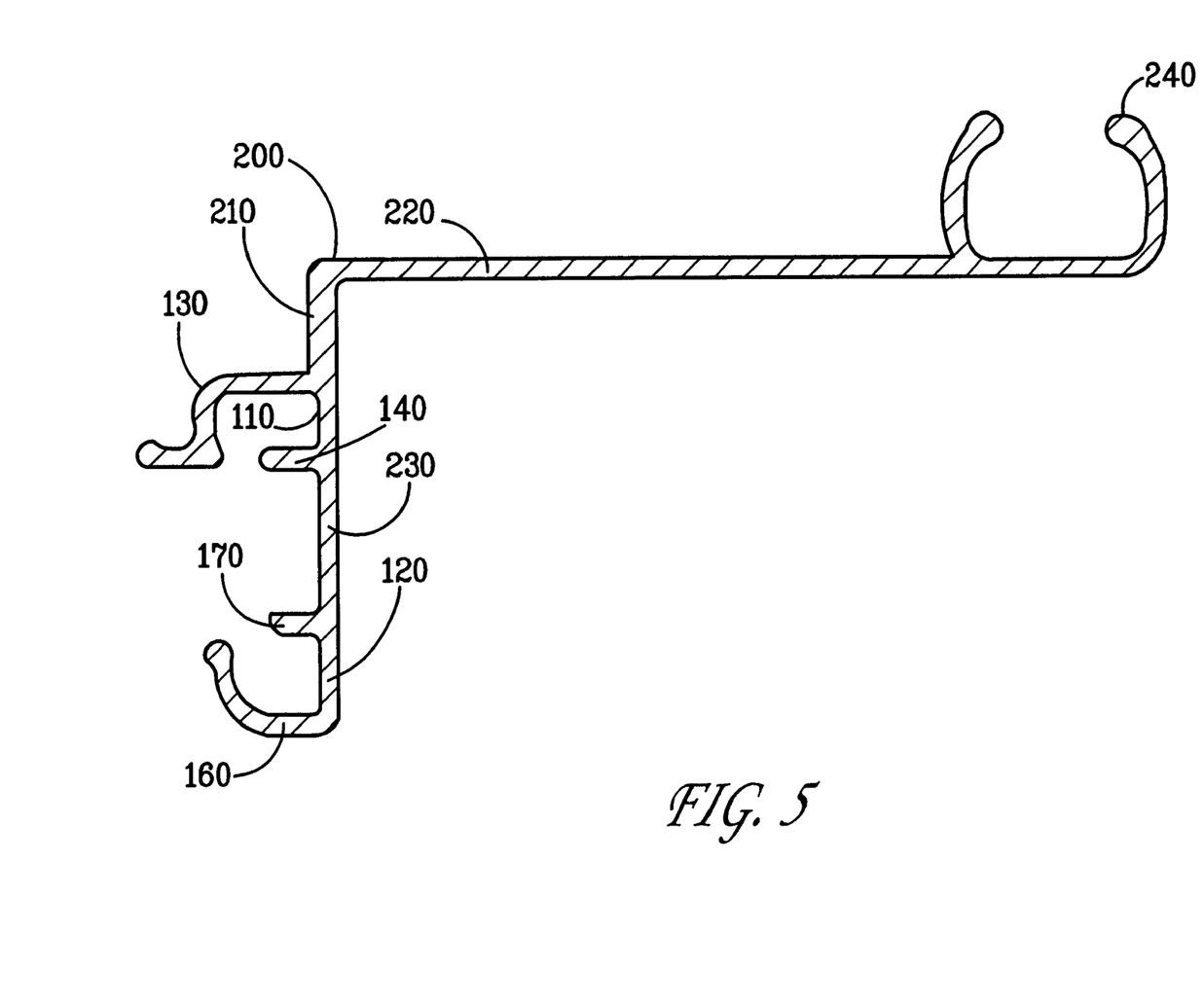
FIG. 5 is a cross-sectional view of the base, female locking member, and attachment member utilized in the presently preferred embodiment.

Referring now to FIG. 5, shown is a cross-sectional view of the base, female locking member, and attachment member utilized in the presently preferred embodiment. In the presently preferred embodiment, the base 200 is comprised of locking plane 210 and attachment plane 220. In this embodiment, the locking plane 210 is perpendicular to the attachment plane 220, such that the base 200 is "L" shaped.

In the presently preferred embodiment, the female locking member 100 is formed out of a locking support 230, from which the primary curved member 130, the primary projection 140, the secondary curved member 160, and the secondary projection 170 extend. In the preferred embodiment, the locking support 230 is the end portion of the locking plane 210. In an alternative embodiment, the entire locking plane 210 could serve as the locking support 230. In yet another embodiment, the locking support 230 could be in the middle of, or at some other point in, the locking plane 210.

The other portion of the base 200, the attachment plane 220, supports the attachment member 240. The attachment member 240 is a device for attaching mesh. Since the preferred embodiment utilizes an attachment plane 220 that is perpendicular to the locking plane 210, the base 200 acts as a frame for the structure. In the presently preferred embodiment, the base 200 is composed of aluminum.

Figure 6:
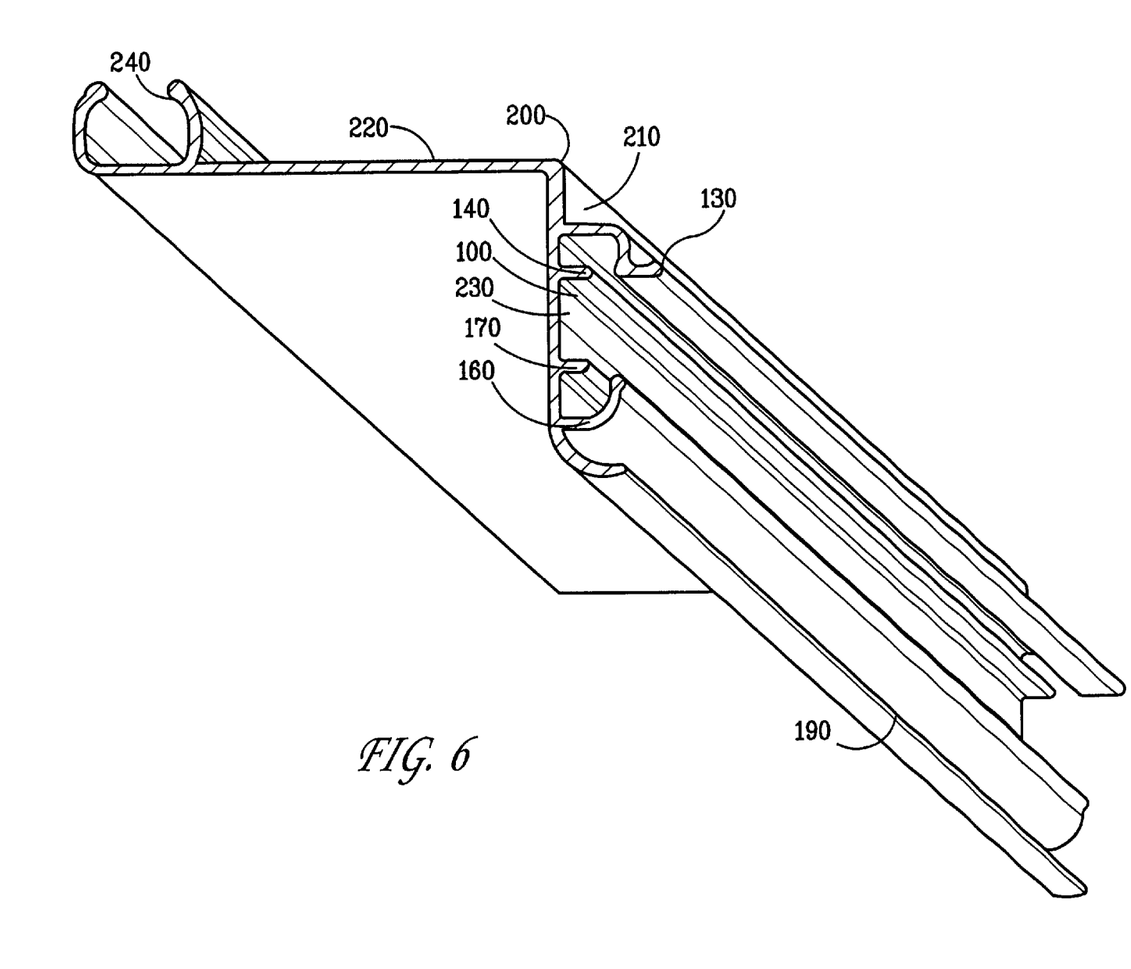
FIG. 6 is a perspective view of the base, female locking member, gutter, and attachment member utilized in the presently preferred embodiment.

Referring now to FIG. 6, shown is a perspective view of the base, female locking member, gutter, and attachment member utilized in the presently preferred embodiment. The base 200 is constructed in the shape of a right angle. Its angular shape eliminates the need for fitting an angled profile in addition to the devices for locking sheets and attaching mesh. The locking plane 230 provides the foundation for the female locking member 100 and the gutter 190.

The gutter 190 is a device for collecting and draining condensation water that accumulates on the roof of a hothouse. Vapor initially rises to the roof of the structure and descends to the point of connection between the roof and base 200, and then further into the gutter 190. The water collects and flows in the gutter 190, which is continuously attached to other gutters attached to the roof of the structure. In this way, the gutter 190 enables the collection and drainage of the condensation to one or more places, as designated by the assembler.

Figure 7:
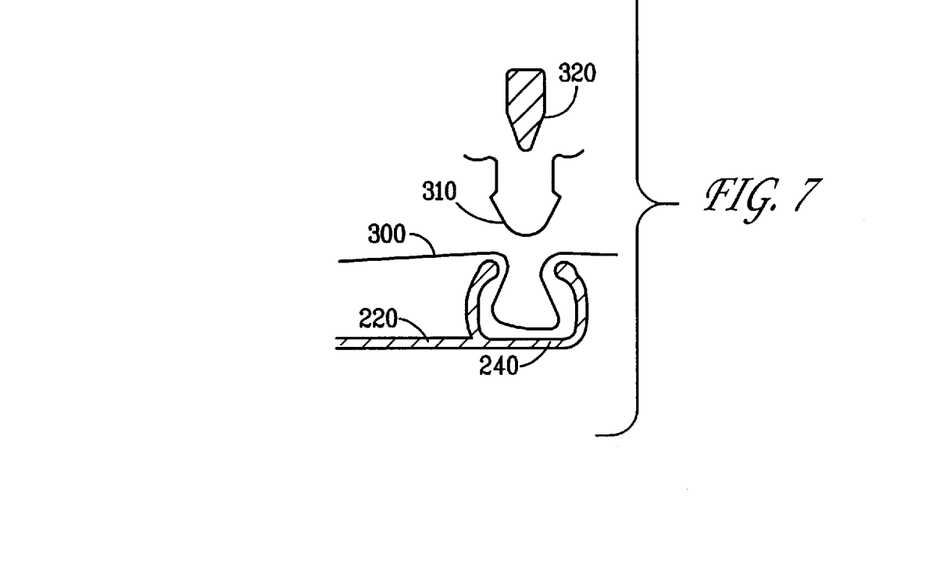
FIG. 7 is a cross-sectional view of the attachment member and the first and second attachment profiles utilized in the presently preferred embodiment.

The attachment member 240, in the presently preferred embodiment is used to attach mesh to the base 200. As seen in FIG. 7, the attachment member 240 attaches mesh 300 using a first insert 310 and a second insert 320. In the presently preferred embodiment, the first insert 310 and second insert 320 are made of P.V.C. First, the mesh 300 is placed between the attachment member 240 and the first insert 310. The first insert 310 is then pushed down to hold the mesh 300 in place. In the presently preferred embodiment, the first insert 310 is shaped to allow flexibility while pushing in the aluminum. Next, the second insert 320 is pushed into the first insert 310. This locks the mesh 300 in place. In the alternative, several other methods of attaching the mesh may be utilized. For example, a single insert system may be used to attach the mesh.

Figure 8:
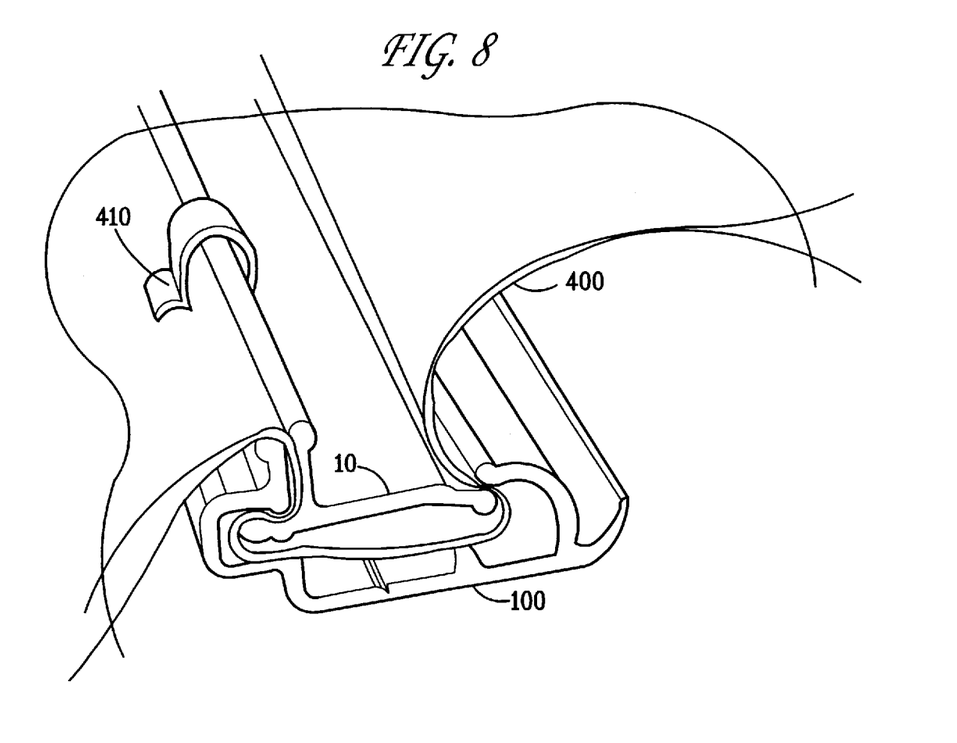
FIG. 8 is a perpective view of the male locking member and female locking member interconnected with a sheet of material.

FIG. 8 depicts the male locking member 10 and female locking member 100 inconnected with a sheet of material 400. The sheet of paper, mesh, plastic, nylon, cloth, or other material 400 is placed in between the male locking member 10 and female locking member 100. In this formation, the sheet 400 is held in place when the male locking member 10 and female locking 100. FIG. 8, additionally shows the presence of an additional clip 410 which may be used to strengthen the initial locking and may ve removed manually at will.

By integrating a device for attaching mesh, a device for active multi-locking of sheets, and a device for collecting and draining condensation water in a right angled profile, the presently preferred embodiment provides several advances for use in hothouses, greenhouses, or other structures.

It is to be understood that a wide range of changes and modifications to the embodiments described above will be apparent to those skilled in the art and are contemplated. It is, therefore, intended that the foregoing detailed description be regarded as illustrative rather than limiting, and that it be understood that it is the following claims, including all equivalents, that are intended to define the spirit and scope of the invention.

I claim:

1. A device for locking of sheets of material and collection of condensation water comprising:
    a base;
    a male locking member, said male locking member comprising a primary protrusion, a secondary protrusion, and a support extension;
    a female locking member integrally formed with said base, said female locking member comprising a primary locking portion abutting said primary protrusion and a secondary locking portion abutting said secondary protrusion;
    a gutter integrally formed with said female locking member; and
    an attachment member integrally formed with said base.

2. The device in claim 1 wherein said base comprises an attachment plane and a locking plane.

3. The device in claim 1 wherein said base is L-shaped.

4. The device in claim 1 wherein said gutter is integrally formed with a curved member of said female locking member.

5. A device for locking of sheets and collection of condensation water comprising:
    a base;
    a male locking member, said male locking member comprising a primary protrusion, a secondary protrusion abutting said primary protrusion, and a support extension abutting said primary protrusion and said secondary protrusion;
    a female locking member integrally formed with said base, said female locking member comprising a primary locking portion abutting said primary protrusion and a secondary locking portion abutting said secondary protrusion;
    a gutter integrally formed with said base; and
    an attachment member integrally formed with said base.

6. A locking device comprising:
    a male locking member, said male locking member comprising:
        a primary protrusion, said primary protrusion comprising a spline formed out of a first end of said primary protrusion and a bending portion formed from a second end of said primary protrusion;
        a secondary protrusion, said secondary protrusion comprising a straight portion and a bent portion, said straight portion comprising a first end affixed to said first end of said primary protrusion and a second end affixed to said bent portion of said secondary protrusion;
        a support extension, said support extension affixed to said first end of said primary protrusion and to said first end of said secondary protrusion;
    a female locking member, said female locking member comprising:
        a locking plane, locking support having a first end, second end, and a middle;
        a primary locking portion, said primary locking portion comprising a primary curved member affixed to said first end of said locking support and a primary projection affixed in between said first end and said midpoint of said locking support;
        a secondary locking portion, said secondary locking portion comprising a secondary curved member affixed to said second end of said locking support and a secondary projection affixed in between said second end and said midpoint of said locking support;
    wherein said primary protrusion abuts said primary locking portion and said secondary protrusion abuts said secondary locking portion when said male locking member and said female locking member are joined.

7. A device for active multi-locking of sheets and collection of condensation water comprising:
    a locking plane having a first end and second end;
    an attachment plane having a first end and second end, said first end of said attachment plane affixed to said first end of said locking plane;
    a female locking member formed on the second end of said locking plane;
    an attachment member formed on the second end of said attachment plane; and
    a male locking member operative to join with said female locking member.

8. A device for active multi-locking of sheets and collection of condensation water comprising:
    a frame;
    a means for locking wherein said means for locking is integrally formed from said frame;
    a means for collecting condensation wherein said means for collecting condensation is integrally formed with a component of said means for locking; and
    a means for attaching sheets of material wherein said means for attaching sheets of material is integrally formed from said frame and is aligned perpendicular to said means for locking.

9. A locking device comprising:
    a male locking member, said male locking member comprising a primary protrusion, a secondary protrusion abutting said primary protrusion, and a support extension abutting said primary protrusion and said secondary protrusion;
    a female locking member, said female locking member comprising a locking support, a primary locking portion integrally formed on a first end of said locking support, and a secondary locking portion integrally formed on a second end of said locking support; and a gutter integrally formed with said female locking member;

wherein said primary protrusion abuts said primary locking portion and said secondary protrusion abuts said secondary locking portion when said male locking member and said female locking member are joined.

10. The locking device in claim 9 wherein said gutter extends from said first side of said locking support.

11. The locking device in claim 9 wherein said gutter extends from said second side of said locking support.

12. The locking device in claim 9 wherein said gutter is integrally formed with said primary locking portion.

13. The locking device in claim 9 wherein said gutter is integrally formed with said secondary locking portion.

14. The locking device in claim 9 further comprising an attachment plane and a locking plane, said attachment plane having a first end and a second end, said locking plane having a first end affixed to said first end of said attachment plane.

15. The locking device in claim 14 wherein said locking support constitutes a portion of said locking plane.

16. The locking device in claim 14 wherein said attachment plane is perpendicular to said locking plane.

17. The locking device in claim 14 further comprising an attachment member affixed to said attachment plane.

* * * * *

UNITED STATES PATENT AND TRADEMARK OFFICE
CERTIFICATE OF CORRECTION

PATENT NO. : 6,314,684 B1
DATED : November 13, 2001
INVENTOR(S) : Itzik Aviram

It is certified that error appears in the above-identified patent and that said Letters Patent is hereby corrected as shown below:

<u>Title page,</u>
Item [73], delete "(IR)" and substitute -- (IL) -- in its place.

Signed and Sealed this

Eighteenth Day of February, 2003

JAMES E. ROGAN
*Director of the United States Patent and Trademark Office*